(12) United States Patent
Van Den Enden et al.

(10) Patent No.: US 6,269,071 B1
(45) Date of Patent: Jul. 31, 2001

(54) OPTICAL RECORD CARRIER

(75) Inventors: Gijsbert J. Van Den Enden, Veldhoven; Johannes H. M. Spruit, Eindhoven; Johannes J. L. M. Van Vlerken, Eindhoven; Ronald R. Drenten, Eindhoven, all of (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/268,256

(22) Filed: Mar. 15, 1999

(30) Foreign Application Priority Data

Mar. 19, 1998 (EP) .................................................. 98200824
Aug. 6, 1998 (EP) .................................................. 98202648

(51) Int. Cl.$^7$ ...................................................... G11B 7/00
(52) U.S. Cl. .................................... 369/275.4; 369/44.13; 369/47.1

(58) Field of Search ............................ 369/44.13, 44.28, 369/44.26, 44.25, 44.34, 47, 48, 49, 50, 54, 58, 275.3, 275.4, 47.1, 53.1, 53.41

(56) References Cited

U.S. PATENT DOCUMENTS

| | | | |
|---|---|---|---|
| 5,023,856 | 6/1991 | Raaymakers et al. | 369/32 |
| 5,235,576 * | 8/1993 | Shigemori | 369/44.26 X |
| 5,321,675 * | 6/1994 | Ito et al. | 369/44.28 X |
| 6,088,307 * | 7/2000 | Fushimi et al. | 369/44.13 |

* cited by examiner

*Primary Examiner*—Muhammad Edun
(74) *Attorney, Agent, or Firm*—Michael E. Belk

(57) ABSTRACT

An optical record carrier has parallel tracks for recording user information in a pattern of optically detectable marks, the tracks being provided with control information. The tracks are grouped in pairs of neighboring tracks. The control information in both tracks of a pair is identical and the control information in tracks of different pairs is different. The identity of the control information reduces the effect of crosstalk on neighboring tracks.

10 Claims, 2 Drawing Sheets

Figure 3:
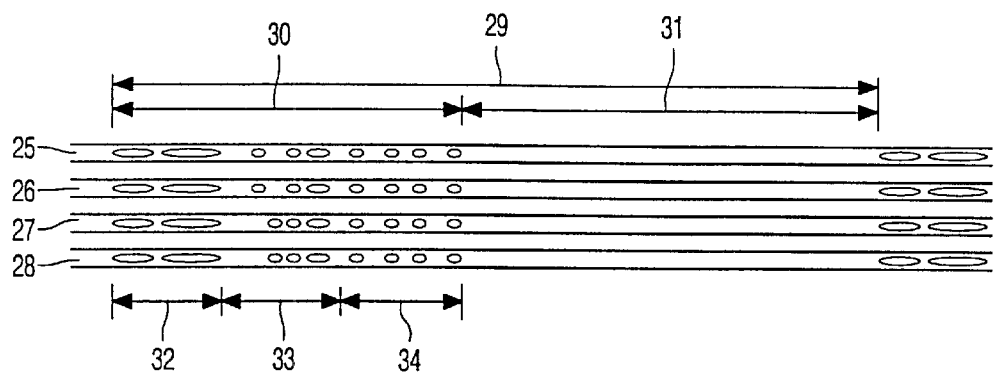

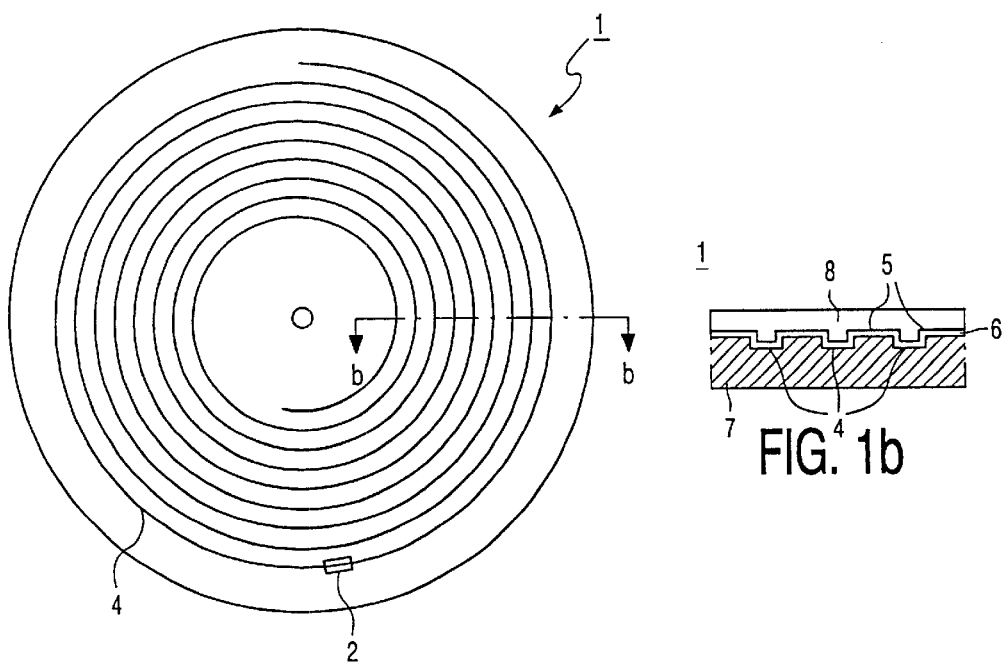
FIG. 1a
FIG. 1b
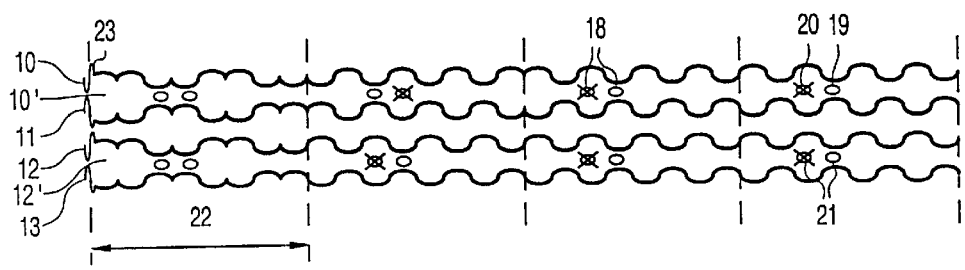
FIG. 2a
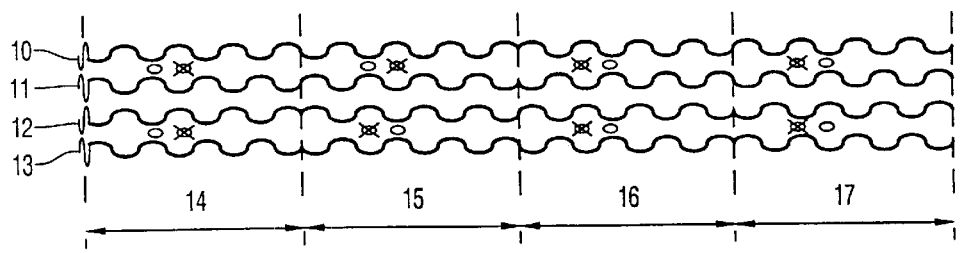
FIG. 2b

OPTICAL RECORD CARRIER

The invention relates to an optical record carrier comprising a recording layer having substantially parallel tracks for recording user information in a pattern of optically detectable marks, the tracks being provided with control information.

The invention also relates to an apparatus for scanning such a record carrier.

When writing user information on a record carrier by means of a scanning radiation spot, it is in general desirable to know the position of the radiation spot on the record carrier. Since user information is not available on a virgin recordable record carrier, the position may be determined by reading control information stored comprising position information and stored on the record carrier, for instance in the form of embossed wobbled grooves or embossed pits of the record carrier. The control information may also comprise recording information, such as write or erase powers, which may be give as a function of the wavelength of the radiation spot and/or the write speed.

In general, a track is a line on the record carrier to be followed by a scanning device and which has a length of the order of a characteristic dimension of the record carrier. A track on a rectangular record carrier has a length substantially equal to the length or width of the record carrier. A track on a disc-shaped record carrier is a 360° turn of a continuous spiral line or a circular line on the disc.

A track may be a series of marks arranged along a line. A track may also be a groove and/or a land portion between grooves. A groove is a trench-like feature in a land portion of the recording layer, the bottom of the trench being nearer to or further away from the light-incident side of the record carrier. User information may be recorded on the lands or in the grooves. The embossed pits may be located on the lands or in the grooves.

A record carrier according to the preamble is known from U.S. Pat. No. 5,023,856, which has tracks provided with grooves. The position of the centre of the grooves is modulated in a direction transverse to the length direction of the groove. The wobble of the groove represents control information in the form of addresses indicating the position on the record carrier. A disadvantage of this known modulation scheme is the increase in crosstalk of control information between neighbouring tracks when the track pitch is reduced.

It is an object of the invention to provide a record carrier having a reduced crosstalk of the control information between neighbouring tracks.

This object is met if, according to the invention, the tracks of the record carrier are grouped in pairs of neighbouring tracks, the control information in both tracks of a pair being identical and the control information in tracks of different pairs being different. When scanning a track on the record carrier, the crosstalk of only one neighbouring track, i.e. the one having different control information, will affect the reading of the control information of the track being scanned. The crosstalk of the other neighbouring track, having identical control information preferably over its entire length, will hardly affect or even enhance the reading of the control information of the track currently being scanned. Preferably, at least 90% of the pairs on the record carrier have identical control information in the two tracks. Also, preferably at most 10% of the tracks of the record carrier comprise identical information.

The lower crosstalk improves the quality of the read signal that can be obtained from the control data on the record carrier. Hence, the amount of overhead of error-detection data and error-correction data added to the control data can be reduced on a record carrier according to the invention. The invention also allows a reduction of the track period, thereby increasing the user information storage capacity of the record carrier.

The tracks of the record carrier are preferably provided with wobbled longitudinal grooves, the control information being encoded in the wobbles of the grooves. The reading of user information and control information can now be separated.

The wobble is preferably a transverse displacement of the groove centre line. This allows the user information to be derived from the so-called central-aperture signal and the control information from the so-called push-pull signal. The pairing of the tracks according to the invention reduces the crosstalk of neighbouring tracks on the push-pull signal.

The wobbles of both tracks in a pair are preferably in antiphase. The amplitude of the push-pull signal obtained when reading a track is enhanced by the antiphase of the modulation of the groove of the neighbouring track.

The control information of substantially each track comprises preferably a marker pattern, allowing a determination of the position of the radiation spot along a track. In combination with the antiphase groove wobble, the marker may be used to determine which one of the two tracks in a pair is currently being scanned.

Another object of the invention is to provide an apparatus for scanning the optical record carrier according to the invention. The apparatus comprises an optical system for scanning the tracks by a radiation beam, a detector for detecting a radiation beam coming from the record carrier and a first circuit for deriving the user information from an output signal of the detector and a second circuit for deriving the control information from an output signal of the detector, and is characterized in that the apparatus comprises a third circuit for identifying the track of a pair being currently scanned from the control information. Since the control information in the two tracks of a pair is identical, the determination of the addresses from the control information does not suffice to identify the track currently being scanned. The apparatus according to the invention uses the control information to allow the identification of the correct track from the pair of tracks.

In a preferred embodiment the apparatus identifies the track by means of the track wobble, the phase of which is suitable for identification purposes, or from a comparison of control information stored in the track being currently scanned and a neighbouring track.

Figure 4:
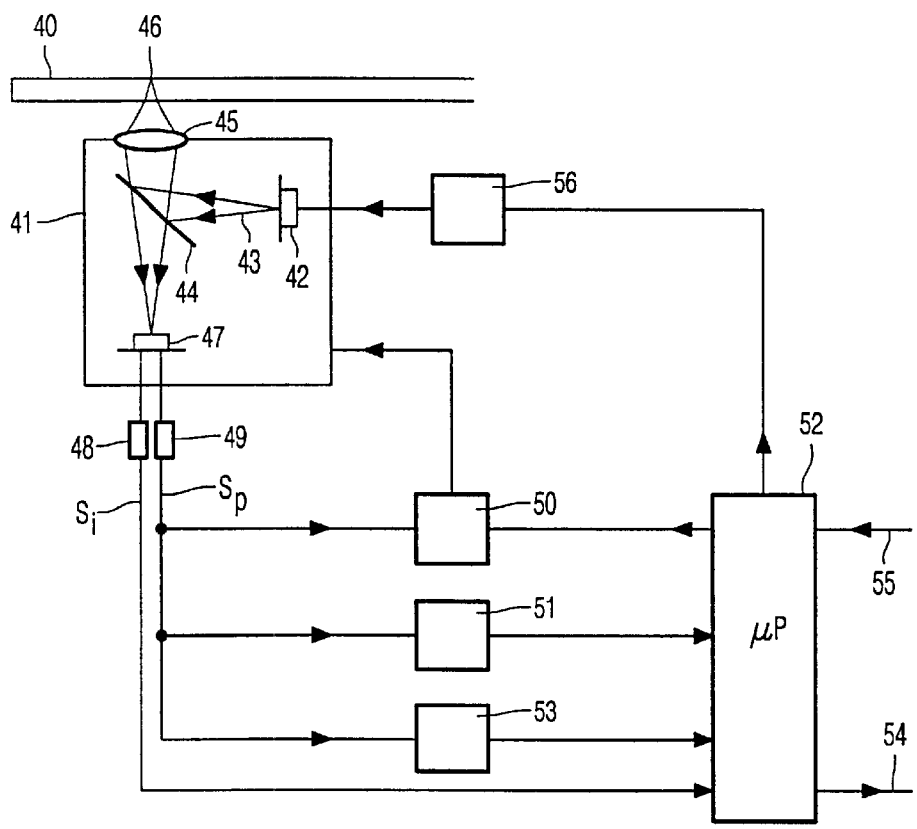

The objects, advantages and features of the invention will be apparent from the following more particular description of preferred embodiments of the invention, as illustrated in the accompanying drawings, in which FIGS. 1a and 1b show a plan view and a cross section of an embodiment of a record carrier according to the invention, FIGS. 2a and 2b show enlarged sections of four neighbouring tracks on the record carrier, FIG. 3 shows four tracks of an embodiment of a record carrier, and FIG. 4 shows a scanning device according to the invention.

FIG. 1 shows an embodiment of a disc-shaped record carrier 1 according to the invention, FIG. 1a being a plan view and FIG. 1b showing a small part in a sectional view taken along the line b—b. The record carrier 1 comprises a series of tracks, each forming a 360° turn of a spiral line, of which some eight are shown in the Figure. A track is constituted, for example, by a preformed groove 4 or ridge 5 or a combination of a groove and a ridge. The tracks are intended for positioning a radiation beam on the tracks. For the purpose of recording user information the record carrier 1 comprises a recording layer 6, which is deposited on a transparent substrate 7 and which is covered by a protective coating 8. The tracks are scanned by a radiation beam entering the record carrier through substrate 7. The recording layer is made of a radiation-sensitive material which, if exposed to suitable radiation, is subjected to an optically detectable change. Such a layer may be, for example, a thin layer of material such as tellurium or a dye, which changes reflection upon heating by a radiation beam. Alternatively, the layer may consist of magneto-optic or phase-change materials, which change direction of magnetization or crystalline structure, respectively, upon heating. Examples of phase change materials are compounds comprising tellurium such as AgInSbTe or GeSbTe. When the tracks are scanned by a radiation beam the intensity of which is modulated in conformity with the user information to be recorded, an information pattern of optically detectable marks is obtained, which pattern is representative of the information. In a non-recordable, read-only record carrier the layer 6 may be a reflective layer, for example made from a metal such as aluminium or silver. The user information in such a record carrier is prerecorded in the record carrier during its manufacture, for example in the form of embossed pits.

The groove period in a radial direction of the record carrier shown in FIG. 1*a* and 1*b* is 0.74 μm, the widths of the land portion 5 and of the groove 4 being approximately equal. The depth of the groove is 50 nm. The record carrier is suitable for being scanned by a radiation beam having a wavelength between 635 and 650 nm.

FIGS. 2*a* and 2*b* show an enlarged plan view of two sections of four neighbouring tracks of the record carrier shown in FIG. 1. The disc-shaped record carrier of this embodiment is divided into 16 segments, thereby dividing each track into 16 consecutive segments of equal angular extent. Each segment of a track is divided in 16 sequences. FIG. 2*a* shows the first sequence of four neighbouring tracks 10, 11 , 12 and 13 forming a pair 10, 11 and a pair 12, 13. FIG. 2*b* shows the layout of each of the second to the sixteenth sequence of the tracks 10, 11, 12 and 13. Each sequence contains four consecutive bit cells 14, 15, 16, 17.

The groove of a track is indicated by a thick undulating line and the area between two neighbouring lines is the land portion between grooves. The width of the land portions in FIGS. 2*a* and 2*b* is exaggerated with respect to the width of the grooves for reasons of clarity. User information is written in the grooves by a radiation beam which is guided substantially along the centre line of the groove. The centre-line of the grooves has a radial wobble with a 20 to 30 nm peak-to-peak deviation. The depth of the grooves in this embodiment is about 50 nm. A bit cell comprises four 360° periods of the wobble.

A track in a segment comprises 16 sequences of four bit cells each, making a total of 64 bit cells per segment. The first bit cell 22 of a segment contains a synchronisation bit. Each of the 63 subsequent bit cells represents a logical value of a data bit. The information represented by the data bits is phase-encoded in the groove wobble. The groove wobble of bit cell 14 represents a logical '1' for all four tracks 10, 11, 12 and 13. The groove wobble of bit cell 16 represents a logical '0' for all four tracks. The sequence of 63 values in the bit cells represents control information, such as the layer number in a multilayer record carrier, track number, segment number and error-correction data. The wobble of groove 10 and the wobble of groove 11 contain identical control information over the entire length of the track. The same applies to the wobbles of grooves 12 and 13. The wobble of groove 10 is in antiphase with the wobble of groove 11. Likewise, the wobbles of the grooves 12 and 13 are in antiphase.

Each track comprises at least one marker pattern in the form of a so-called clock mark 23, i.e. a relatively fast modulation of the groove, at the start of a sequence. A clock mark in the even-numbered track 10 changes from a zero deviation to a minimum deviation, to a maximum deviation and back to a zero deviation. The deviation is the distance of the centre-line of the groove to the centre line of the land portion between the two tracks of a pair. A clock mark in the odd-numbered tracks 11 changes from a zero deviation to a minimum deviation, to a maximum deviation and back to a zero deviation. The clock marks may be used for synchronisation purposes. The polarity of a clock mark may be used to determine whether the track being scanned is an even-numbered track or an odd-numbered track.

In a special embodiment of the record carrier, each bit cell comprises predetermined positions at which a pit may be present. The predetermined positions are on the land portions between tracks of a pair and are indicated by circles 18. A predetermined position with a pit is indicated by an open circle 19, a predetermined position without a pit is indicated by a crossed circle 20. The pits in the Figure are only on the land portion 10' between tracks 10 and 11 and land portion 12' between tracks 12 and 13, and are specific for the special embodiment of the record carrier. The depth of the pits is substantially the same as that of the grooves, i.e. 50 nm in this embodiment. The width of the pits may be smaller than the width of the land portion at the position of the pit. However, the width may also be equal to that of the land portion, thereby forming a connection between the two grooves on both sides of the land portion. The positions are grouped in doublets 21 of two neighbouring positions. The predetermined positions of the doublet in the embodiment shown are at 90°±10° and 270°±10° of the second period of the wobble in a bit cell.

The phase of the wobble of the groove in the special embodiment of the record carrier is such that the deviation of the groove has a maximum value at a predetermined position 20 without pit and a minimum value at a predetermined position 19 with a pit. In the embodiment shown in FIG. 2 this applies to the grooves on both sides of the predetermined positions, i.e. the grooves of a pair. Hence, the wobble of the even grooves 10, 12 is in antiphase with the wobble of the odd grooves 11, 13. The wobble of this embodiment has no phase jumps in bit cells containing a data bit. The wobble has several 180° phase jumps in the bit cell containing a synchronisation bit. The phase of the wobble depends on the logical value represented by the bit cell. This allows a scanning device to read the information stored in the bit cells not only from the modulation of the radiation beam from the record carrier generated by the pits but also from the modulation generated by the phase of the wobble. When the radiation beam follows groove 10, the information stored in the pits on land portion 10' can be derived from the so-called push-pull signal. The same information can be obtained when scanning groove 11. The scanning device can determine whether it scans an even groove 11 or an odd groove 10 from the phase of the clock marks 23 or from the phase of the groove wobble in the first segment 22. The information stored in the pits on a land portion is common to the two grooves on both sides of the land portion.

The bit cells in the above-described embodiments of the record carrier have an equal angular extent on the record carrier. Alternatively, the record carrier may be divided in several radial zones, the bit cells within a zone having an equal angular extent and the bit cells of the innermost track of all zones having a substantially equal linear extent. The zone boundaries are preferably located between track pairs. A zone should comprise at least one pair, i.e. two tracks.

The invention is not limited to the wobble patterns shown in the Figures. The pattern of a bit cell may comprise more or fewer complete sine waves instead of the four sine waves shown in FIGS. 2a and 2b. The average value of the deviation of each pattern or of a series of patterns is preferably equal to zero in order to avoid offsets in the radial tracking of the radiation beam. The pattern may comprise sections with zero deviation in order to avoid sharp transitions in the deviation. Instead of the sinusoidal pattern, other patterns may be used, such as a triangular pattern or a sinc-function pattern. The control information may also be encoded in a frequency modulation of the groove wobble.

FIG. 3 shows four neighbouring tracks of another embodiment of the record carrier according to the invention. The tracks 25, 26, 27 and 28 may be grooves separated by lands or lands separated by grooves. The tracks are divided into consecutive sectors 29, one of which is shown for each track in the Figure. Each sector is preceded by a header 30, which is provided with a series of embossed pits representing control information. The track portion 31 in a sector following the header is available for recording user information. Header 30 comprises a sector identifier 32, a sector address 33 and a so-called VFO field 34 for locking phase-locked loops of a scanning device. The control information contained in the sector identifier and VFO field is identical for all sectors. The control information in sector address 33, representing the sector address is identical for two neighbouring sectors in tracks 25 and 26 and also for two neighbouring sectors in tracks 27 and 28. The addresses in tracks 25 and 26 are different from the addresses in tracks 27 and 28. The addresses may be ordinal numbers, which increasing by one for each pair of tracks. Alternatively, the address may be the ordinal number of the even-numbered or odd-numbered track of each pair.

FIG. 4 shows an apparatus for scanning a record carrier as shown in FIG. 1. The apparatus comprises an optical system 41 for optically scanning tracks in record carrier 40. Optical system 41 comprises a radiation source 42, for example a semiconductor laser. Radiation source 42 emits a radiation beam 43, which is reflected by a beam splitter 44 and converged by an objective lens 45 to a radiation spot 46 on the tracks in an information layer of record carrier 40. Radiation reflected from the record carrier is guided through objective lens 45 and beam splitter 44 to a detector 47. The detector is a split-detector having a dividing line between the two halves of the detector running parallel to the direction of the tracks being scanned. A first electronic circuit 48 forms the sum signal of the two halves, usually called the central aperture signal. The central aperture signal represents the user information recorded in the tracks and is output as signal $S_i$. A second electronic circuit 49 forms the difference signal of the two halves, usually called the push-pull signal. The push pull signal represents control information and servo information recorded in the tracks, and is output as signal $S_p$. The low-frequency content of the signal $S_p$ represents the servo information, indicating the position of the radiation spot 46 with respect to the centre-line of the track being scanned. The signal $S_p$ is used as input for a servo circuit 50, possibly after a low-pass filter which passes the servo information but blocks the control information. The servo circuit controls the position of the radiation spot in a direction perpendicular to the direction of the track by controlling the position of optical system 41 and/or the position of objective lens 45 within the optical system.

The signal $S_p$ is also fed into a signal processor 51, which extracts the control information from the signal $S_p$. The control-information signal output from signal processor 51 is fed into a micro-processor 52. The micro-processor can derive, for example, the current position of radiation spot 46 on record carrier 40 from the control-information signal. During reading, erasing or writing, the micro-processor can compare the current position with a desired position and determine the parameters for a jump of the optical system to the required position. The parameters for the jump are fed into servo circuit 48.

A third electronic circuit 53 extracts clock marks 23 from signal $S_p$ and determines the phase of the clock mark. A signal representing the phase of the clock marks is output to micro-processor 52. If, for example, radiation spot 46 must scan track 10 as shown in FIG. 2a, the spot will be placed at the correct radial position and the scanning device will read the control information from the track in order to determine the address of the sector to verify the correct positioning. The device will read the same address when it scans track 10 or track 11. The output signal of circuit 53 is used to distinguish between the two tracks, because the clock marks of tracks 10 and 11 have opposite phases. Hence, the combination of the address and the phase of the clock marks, both derived from the control signal, allows the correct determination of the tracks on the record carrier. In an alternative embodiment, the phase of the synchronization bit 22 is used to identify the track. The track may also be identified by reading control information from two neighbouring tracks and comparing the information. If the information is identical, the two tracks scanned are from the same pair of tracks, if the information is different, the two tracks are from two neighbouring pairs.

The information signal $S_i$ is fed into the micro-processor, enabling it to derive for instance directory information from the signal, which may be used for controlling the position of the radiation spot. The information signal is provided as output signal 54 of micro-processor 52.

When writing user information on a record carrier having prerecorded servo tracks comprising position information, the user information to be recorded is fed into micro-processor 52 by a signal 55. The scanning device reads the position information from the servo tracks. Micro-processor 52 synchronizes the information to be written with the position information and generates a control signal which is connected to a source control unit 56. Source control unit 56 controls the optical power of the radiation beam emitted by radiation source 42, thereby controlling the formation of marks in record carrier 40. The synchronisation may involve the imposition of a fixed relation between the synchronisation patterns in the control information and synchronisation patterns present in the user information signal to be recorded.

What is claimed is:

1. An optical information carrier comprising:
   a substrate;
   a recording layer on the substrate having substantially parallel adjacent tracks for recording user information as a pattern of optically detectable marks; and
   control information provided in the tracks prior to recording the user information, the tracks being organised into a series of multiple pairs of adjacent tracks, the control information in a pair of tracks being positioned side-by-side, the control information in each track being more similar to the control information in the other track of the pair of tracks than to the control information in any other adjacent track.

2. The carrier of claim 1, wherein the tracks are provided with wobbled longitudinal grooves, the control information being encoded in the wobbles of the grooves.

3. The carrier of claim 2, wherein the wobble is a transverse displacement of the groove center line.

4. The carrier of claim 3, wherein the wobbles of both tracks in a pair are in anti-phase.

5. The carrier of claim 1, wherein the control information of substantially each track includes a marker pattern.

6. The carrier of claim 1, wherein the control information includes address information.

7. An apparatus for scanning an optical record carrier comprising a recording layer having substantially parallel tracks for recording user information in a pattern of optically detectable marks, the tracks being provided with control information and grouped in pairs of neighbouring tracks, the control information in both tracks of a pair being identical and the control information in tracks of different pairs being different, the apparatus comprising an optical system for scanning the tracks by a radiation beam, a detector for detecting a radiation beam coming from the record carrier and a first circuit for deriving the user information from an output signal of the detector and a second circuit for deriving the control information from an output signal of the detector, characterized in that the apparatus comprises a third circuit for identifying the track of a pair being currently scanned from the control information.

8. An apparatus for scanning an optical record carrier including: a recording layer on the substrate having substantially parallel adjacent tracks for recording user information as a pattern of optically detectable marks; and control information provided in the tracks prior to recording the user information, the tracks being organised into a series of multiple pairs of adjacent tracks, the control information in a pair of tracks being positioned side-by-side, the control information in each track being more similar to the control information in the other track of the pair of tracks than to the control information in any other adjacent track, comprising:

an optical system for scanning the tracks by a radiation beam, a detector for detecting a radiation beam coming from the record carrier;

a first circuit for deriving the user information from an output signal of the detector;

a second circuit for deriving the control information from an output signal of the detector; and a third circuit for identifying the track of a pair being currently scanned, depending on the control information.

9. The apparatus of claim 8 for scanning the optical record carrier in which the control information of substantially each track includes a marker pattern, and wherein the third circuit is adapted for detecting the marker pattern and for identifying the track being scanned depending on the marker pattern and on address information contained in the control information.

10. The apparatus of claim 8, wherein the third circuit identifies the track being scanned from address information contained in the control information of the track being scanned and from a comparison between control information of the track being scanned and control information of a neighboring track of the pairs of tracks.

* * * * *